US010759249B2

(12) United States Patent
Ohashi et al.

(10) Patent No.: US 10,759,249 B2
(45) Date of Patent: Sep. 1, 2020

(54) VEHICLE-HEIGHT CONTROL SYSTEM

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Hideki Ohashi, Chiryu (JP); Jun Tokumitsu, Toyota (JP); Ryo Kanda, Nissin (JP); Shogo Tanaka, Toyota (JP); Masaaki Oishi, Takahama (JP)

(73) Assignees: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 10 days.

(21) Appl. No.: 16/097,869

(22) PCT Filed: Jun. 8, 2017

(86) PCT No.: PCT/JP2017/021309
§ 371 (c)(1),
(2) Date: Oct. 31, 2018

(87) PCT Pub. No.: WO2017/217315
PCT Pub. Date: Dec. 21, 2017

(65) Prior Publication Data
US 2019/0176562 A1    Jun. 13, 2019

(30) Foreign Application Priority Data
Jun. 17, 2016 (JP) .................................. 2016-121001

(51) Int. Cl.
*B60G 17/052* (2006.01)

(52) U.S. Cl.
CPC .... *B60G 17/0523* (2013.01); *B60G 2500/204* (2013.01); *B60G 2500/205* (2013.01);
(Continued)

(58) Field of Classification Search
CPC ............ B60G 17/0523; B60G 17/0525; B60G 17/0528; B60G 2500/204; B60G 2500/205; B60G 2500/2014; B60G 2500/2021
See application file for complete search history.

(56) References Cited

U.S. PATENT DOCUMENTS 5,159,554 A * 10/1992 Buma ................. B60G 17/0155
280/5.513
6,189,903 B1 * 2/2001 Bloxham ........... B60G 17/0523
280/124.16
(Continued)

FOREIGN PATENT DOCUMENTS

DE         103 31 600 A1    2/2005
DE   10 2012 006 382 A1   10/2013
(Continued)

OTHER PUBLICATIONS

International Search Report for PCT/JP2017/021309 dated Sep. 18, 2017 [PCT/ISA/210].

*Primary Examiner* — Frank B Vanaman
(74) *Attorney, Agent, or Firm* — Sughrue Mion, PLLC (57) ABSTRACT

A vehicle-height control system including a tank, a compressor, an actuator, and a valve between the tank and the compressor. The valve is closed to a state of a pressure medium supplier to the compressor-pressure supply state when a tank pressure has reached a threshold in a tank-pressure supply state in which the tank pressure is supplied to the actuator. In the compressor-pressure supply state, the tank pressure is kept at the threshold, and a pressure in the actuator is greater than the tank pressure. The threshold makes it difficult for a pressure differential in the valve to become greater than a valve-opening pressure differential, making it difficult for the valve to be opened in the compressor-pressure supply state. This system enables good
(Continued)

supply of a pressure medium from the compressor to the actuator, avoiding a longer time for vehicle height control and achieving a shorter compressor operation time.

8 Claims, 8 Drawing Sheets

(52) U.S. Cl.
    CPC ............... *B60G 2500/2014* (2013.01); *B60G 2500/2021* (2013.01)

(56) References Cited

U.S. PATENT DOCUMENTS

| | | | |
|---|---|---|---|
| 2001/0015538 A1* | 8/2001 | Schoop | ............... B60G 17/052 280/124.157 |
| 2001/0017449 A1 | 8/2001 | Stiller | |
| 2002/0153688 A1* | 10/2002 | Jurr | ................... B60G 17/0523 280/124.16 |
| 2005/0212225 A1* | 9/2005 | Suzuki | ............... B60G 17/0155 280/5.514 |
| 2007/0040344 A1 | 2/2007 | Stiller | |
| 2007/0241487 A1* | 10/2007 | Ilias | ................... B60G 17/0523 267/64.28 |
| 2013/0255240 A1 | 10/2013 | Bergemann et al. | |
| 2013/0320645 A1 | 12/2013 | Gall | |
| 2015/0151601 A1 | 6/2015 | Kondo et al. | |
| 2017/0036505 A1* | 2/2017 | Bohn | ..................... F04B 27/005 |

FOREIGN PATENT DOCUMENTS

| | | |
|---|---|---|
| DE | 10 2012 010 390 A1 | 12/2013 |
| EP | 2 878 465 A2 | 6/2015 |
| JP | 3-070615 A | 3/1991 |
| JP | 2001-246919 A | 9/2001 |

* cited by examiner

PRIOR ART

[Fig. 9]

VEHICLE-HEIGHT CONTROL SYSTEM

CROSS REFERENCE TO RELATED APPLICATIONS

This application is a National Stage of International Application No. PCT/JP2017/021309 filed Jun. 8, 2017, claiming priority based on Japanese Patent Application No. 2016-121001 filed Jun. 17, 2016.

TECHNICAL FIELD

The present disclosure relates a vehicle-height control system including a pressure medium supplier that includes a tank and a compressor device.

BACKGROUND ART

Patent Documents 1, 2 disclose vehicle-height control systems each including: an air supply device including a tank, a compressor device, and a cut-off valve provided between the tank and the compressor device; and air cylinders each as a vehicle-height control actuator. In these vehicle-height control systems, air is supplied from the tank or the compressor to the air cylinders to execute up control for increasing a vehicle height.

In the vehicle-height control system disclosed in Patent Document 1, a discharge portion of the compressor and the air cylinders are connected by a first passage and a second passage in parallel, and the cut-off valve as an electromagnetic valve and the tank are provided in series on the first passage. In the vehicle-height control system disclosed in Patent Document 1, in the case where a tank pressure that is a pressure of air contained in the tank at a timing just before the up control (noted that this timing may be hereinafter referred to as "at start of the up control") is greater than or equal to a set pressure, a tank-pressure supply state is established in which air is supplied from the tank to the air cylinders via the first passage. In the case where the tank pressure at the timing just before the up control is less than the set pressure, the compressor device is actuated, and a compressor-pressure supply state is established in which air is supplied from the compressor to the air cylinders via the second passage. The cut-off valve is kept closed during the up control.

In the vehicle-height control system disclosed in Patent Document 2, the tank is connected via an electromagnetic valve in the form of the cut-off valve to a portion of a passage that connects the discharge portion of the compressor and the air cylinders to each other. In the vehicle-height control system disclosed in Patent Document 2, a set length of time is determined based on a difference between a tank pressure and a pressure of the air contained in the air cylinders at a timing just before the up control. When the up control is started, the tank-pressure supply state is established by opening of the cut-off valve. However, when the set length of time is elapsed, the cut-off valve is closed, and the compressor device is actuated to switch a state to the compressor-pressure supply state.

PRIOR ART DOCUMENTS

Patent Documents

Patent Document 1: Japanese Patent Application Publication No. 3-70615

Patent Document 2: Japanese Patent Application Publication No. 2001-246919

SUMMARY

Accordingly, an aspect of the disclosure relates to a vehicle-height control system including a vehicle-height control actuator and a pressure medium supplier including a tank, the compressor device, and a cut-off valve, and to a technique of reducing the possibility of a longer time of operation of a compressor device by preventing or reducing leakage in the cut-off valve in a compressor-pressure supply state.

In a vehicle-height control system according to the present disclosure, in the case where a vehicle height is increased, a state of a pressure medium supplier is switched, from a tank-pressure supply state in which a pressure medium is supplied from the tank to the vehicle-height control actuator, to a compressor-pressure supply state in which the pressure medium is supplied from the compressor to the vehicle-height control actuator by operation of the compressor device, based on a measured tank pressure that is a measured value of a tank pressure (noted that this tank pressure is a pressure of the pressure medium stored in the tank, and this wording appearing in the following description have the same meaning) in the tank-pressure supply state.

In the vehicle-height control system disclosed in Patent Document 2, for example, it is assumed that the cut-off valve has a characteristic in which the cut-off valve is switched from its closed state to its open state when a pressure differential $\Delta P$ that is a value obtained by subtracting a pressure of air on a side of the cut-off valve which is nearer to the tank from a pressure of air on a side of the cut-off valve which is nearer to the discharge portion of the compressor becomes greater than a valve-opening pressure differential $\Delta Pd$. In this assumed vehicle-height control system, air is supplied from the tank to the air cylinders in the tank-pressure supply state, whereby the tank pressure lowers, and a pressure of air in the air cylinders as an air-cylinder pressure increases. In the compressor-pressure supply state, since air discharged from the compressor is supplied to the air cylinders in a state in which the tank pressure is kept constant, the air-cylinder pressure, i.e., a pressure of air in the discharge portion of the compressor is greater than the tank pressure. Thus, the pressure differential $\Delta P$ for the cut-off valve may exceed the valve-opening pressure differential $\Delta Pd$ the compressor-pressure supply state, leading to leakage of air from the cut-off valve. In other words, there is a case where the cut-off valve is opened, and air is supplied from the discharge portion of the compressor to the tank via the cut-off valve even though control for supplying a current to the solenoid is not executed. When the tank pressure increases, and the pressure differential $\Delta P$ for the cut-off valve becomes less than the valve-opening pressure differential $\Delta Pd$, the cut-off valve is closed, and air is supplied from the compressor to the air cylinders. Thereafter, vehicle height control for increasing the vehicle height (hereinafter may be referred to as "up control") is executed while air is supplied from the compressor to the tank and the air cylinders. Thus, the increase gradient of the air-cylinder pressure decreases, resulting in increase in a length of time required for the vehicle height to reach the target vehicle height. This increases a length of time of operation of the compressor device, resulting in increase, in power consumption of a battery.

In the compressor-pressure supply state, while a pressure of air in the discharge portion of the compressor increases with increase in the air-cylinder pressure, the air-cylinder pressure is the highest when the vehicle height has reached the target vehicle height. In the case where the target vehicle height in the up control is determined in advance, the air-cylinder pressure in the case where the vehicle height has reached the target vehicle height can also be obtained in advance. In contrast, the tank pressure is kept at a height that is a value in the case where the state of the pressure medium supplier is switched from the tank-pressure supply state to the compressor-pressure supply state. Thus, the pressure differential ΔP for the cut-off valve is greater in the case where the tank pressure is low, that is, the pressure of air on the side of the cut-off valve which is located nearer to the tank is low, than in the case where the tank pressure is high.

In the present vehicle-height control system, in contrast, the state of the pressure medium supplier is switched to the compressor-pressure supply state based on a measured tank pressure PT in the tank-pressure supply state. For example, the state of the pressure medium supplier may be switched to the compressor-pressure supply state in the case where the measured tank pressure PT has lowered to such a value that makes it difficult for the pressure differential ΔP for the cut-off valve to become greater than the valve-opening pressure differential ΔPd in the compressor-pressure supply state.

As a result, leakage in the cut-off valve is reduced in the compressor-pressure supply state, that is, opening of the cut-off valve is made difficult in the compressor-pressure supply state, thereby making it difficult for the pressure medium to be supplied from the compressor to the tank via the cut-off valve. That is, it is possible to reduce the possibility of a longer operation of the compressor, leading to reduced power consumption of the battery. Also, it is possible to reduce the possibility of increase in a length of time required for the up control.

It is noted that Patent Document 1 does not disclose that the state of the pressure medium supplier is switched front the tank-pressure supply state to the compressor-pressure supply state in the up control. Also, neither Patent Document 1 nor Patent Document 2 discloses leakage in the cut-off valve in the compressor-pressure supply state.

BRIEF DESCRIPTION OF DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, there will be described vehicle-height control systems according to embodiments by reference to the drawings. The present vehicle-height control systems include pressure source devices according to embodiments. Air is utilized as a pressure medium in the embodiments.

First Embodiment

Figure 1:
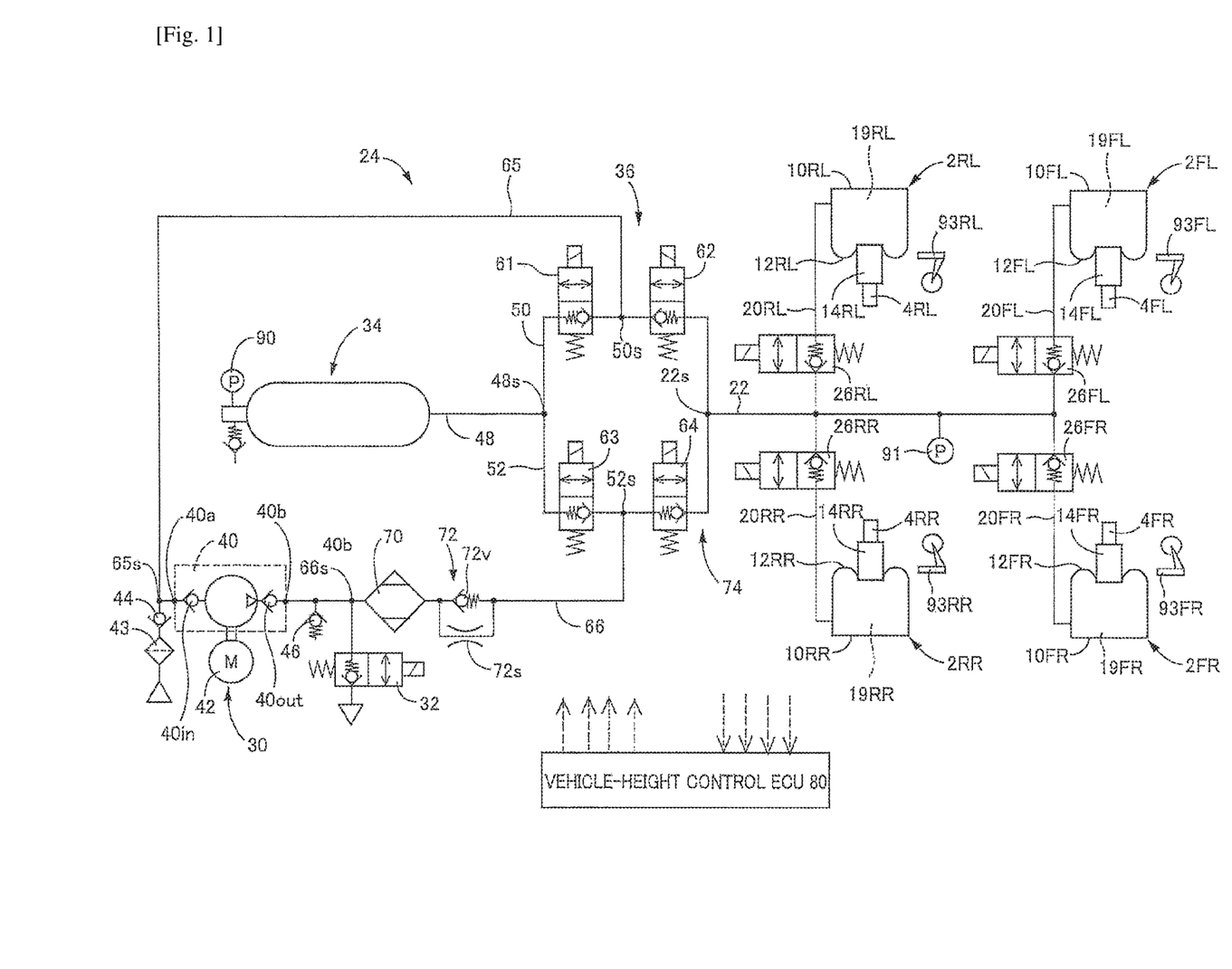
FIG. 1 is a circuit diagram of a vehicle-height control system according to a first embodiment.

In a vehicle-height control system according to a first embodiment, as illustrated in FIG. 1, suspension springs, not illustrated, air cylinders 2FL, 2FR, 2RL, 2RR each as a vehicle-height control actuator, and shock absorbers 4FL, 4FR, 4RL, 4RR are provided in parallel between a wheel-side member and a vehicle-body-side member, not illustrated. The air cylinders 2FL, 2FR, 2RL, 2RR respectively correspond to front left, front right, rear left, and rear right wheels provided on a vehicle. Likewise, the shock absorbers 4FL, 4FR, 4RL, 4RR respectively correspond to the front left, front right, rear left, and rear right wheels. Each of the shock absorbers 4FL, 4FR, 4RL, 4RR includes a cylinder body provided on the wheel-side member and a piston provided on the vehicle-body-side member. In the following description, each of the air cylinders 2 and other similar components will be referred with a corresponding one of suffixes (FL, FR, RL, RR) indicative of the respective wheels where the air cylinders 2 and other similar components should be distinguished by their respective wheel positions. On the other hand, where these devices are collectively referred, or the distinction is not required, each of the air cylinders 2 and other similar components will be referred without such suffixes.

Each of the air cylinders 2 includes: a chamber body 10 as a cylinder body provided on the vehicle-body-side member; a diaphragm 12 fixed to the chamber body 10; and an air piston 14 provided on the diaphragm 12 and the cylinder body of the corresponding shock absorber 4 so as to be movable together with the diaphragm 12 and the cylinder body in the up and down direction. Interiors of these components serve as an air chamber 19 as a pressure medium chamber. When air is supplied to or discharged from the air chamber 19, the air piston 14 is moved relative to the chamber body 10 in the up and down direction. This movement moves the cylinder body and the piston of the shock absorber 4 relative to each other in the up and down direction. As a result, a distance between the wheel-side member and the vehicle-body-side member is changed, that is, a vehicle height is changed.

An air supply and discharge device 24 as a pressure medium supplier is connected to the air chambers 19 of the respective air cylinders 2, via respective individual passages 20 and a common passage 22. Vehicle-height control valves 26 are provided on the respective individual passages 20. Each of the vehicle-height control valves 26 is a normally closed electromagnetic valve. When being in an open state, the vehicle-height control valve 26 allows flow of air in opposite directions. When being in a closed state, the vehicle-height control valve 26 prevents flow of air in a direction directed from the air chambers 19 to the common passage 22 but allows flow of air in the direction directed from the common passage 22 to the air chambers 19 when a pressure of air in the common passage 22 becomes higher than a pressure of air in the air chamber 19 by a set pressure. It is noted that the pressure of air may be hereinafter referred simply as "pressure", and the pressure of air in the air chambers 19 may be hereinafter referred to as "chamber pressure".

The air supply and discharge device 24 includes a compressor device 30, an air discharge valve 32 as one example of a discharge valve, a tank 34, a switching device 36, an intake valve 44 as a supply valve, and a relief valve 46. The compressor device 30 includes a compressor 40 and an electric motor 42 configured to drive the compressor 40 to operate it. In the present embodiment, a plunger pump is used as the compressor 40. When a discharge pressure of the compressor 40 has increased, air is discharged to the atmosphere via the relief valve 46. The compressor 40 includes an intake valve 40in and a discharge valve 40out each as a check valve, which prevent air flow from a discharge side toward an intake side of the compressor 40. The tank 34 stores air in a pressurized state. A pressure of the air in the tank 34 (hereinafter may be referred to as "tank pressure") increases with increase in amount of air stored in the tank 34.

The switching device 36 is provided among the common passage 22, the tank 34, and the compressor device 30 to switch a direction in which air flows among them. The switching device 36 includes a first passage 50, a second passage 52, and circuit valves 61-64. As illustrated in FIG. 1, the common passage 22 and a tank passage 48 connected to the tank 34 are connected to each other by the first passage 50 and the second passage 52 which are provided in parallel. The circuit valves 61, 62 are provided on the first passage 50 in series. The circuit valves 63, 64 are provided on the second passage 52 in series. The tank passage 48 is connected to the first passage 50 and the second passage 52 at a connecting portion 48s. The common passage 22 is connected to the first passage 50 and the second passage 52 at a connecting portion 22s. A third passage 65 connected to an intake-side portion 40a of the compressor 40 is connected to the first passage 50 at its connecting portion 50s located between the two circuit valves 61, 62. A fourth passage 66 connected to a discharge-side portion 40b of the compressor 40 is connected to the second passage 52 at its connecting portion 52s located between the two circuit valves 63, 64.

Each of the circuit valves 61-64 is a normally closed electromagnetic valve. When being in an open state, each of the circuit valves 61-64 allows flow of air in opposite directions. When being in a closed state, each of the circuit valves 61-64 prevents flow of air from one side to the other side but allows flow of air from the other side to the one side when a pressure of air on the other side becomes higher than that on the one side by a set pressure. Each of the circuit valves 61, 63 in the closed state prevents air from flowing out of the tank 34. The circuit valve 62 in the closed state prevents air from flowing out of the common passage 22. The circuit valve 64 in the closed state prevents supply of air to the common passage 22.

In the present embodiment, the compressor device 30 and the air cylinders 2 are connected to each other by a passage 74 constituted by the fourth passage 66, a portion of the second passage 52 between the connecting portion 52s and the connecting portion 22s, the common passage 22, and the individual passages 20, for example. Also, the tank 34 is connected to the connecting portion 52s of the passage 74 by the tank passage 48 and a portion of the second passage 52 between the connecting portion 48s and the connecting portion 52s. The circuit valve 63 as one example of a cut-off valve is provided on the portion of the second passage 52 between the connecting portion 48s and the connecting portion 52s. That is, the circuit valve 63 is located between the tank 34 and the discharge portion 40b of the compressor 40.

As illustrated in FIG. 1, the circuit valve 63 is a normally-closed electromagnetic poppet valve which includes a solenoid, a valve seat, a valve member, and a spring configured to apply an elastic force to the valve member in a direction in which the valve member is to be seated on the valve seat. The circuit valve 63 is closed while the solenoid is OFF. When the solenoid is turned to ON by an electric current supplied thereto, the circuit valve 63 is opened. The circuit valve 63 is installed in a state in which a force related to a pressure differential $\Delta P$ acts on the circuit valve 63 in a direction in which the valve member is moved off the valve seat. The pressure differential $\Delta P$ is obtained by subtracting a pressure of air in a portion located on a side of the circuit valve 63 which is located nearer to the tank 34 from a pressure of air in a portion located on a side of the circuit valve 63 which is located nearer to the connecting portion 52s. With this construction, when the pressure differential $\Delta P$ becomes greater than a valve-opening pressure differential $\Delta Pd$ as the above-described set pressure in the closed state of the circuit valve 63, the circuit valve 63 is opened even in the OFF state of the solenoid, allowing flow of air from the connecting portion 52s to the tank 34, resulting in leakage of air in the circuit valve 63.

The intake valve 44 is provided between a connecting portion 65s of the third passage 65 and the atmosphere as an outside the vehicle-height control system. The intake valve 44 is a mechanical check valve which is opened and closed by a pressure differential. The intake valve 44 is closed when a pressure of air at the connecting portion 65s is equal to or higher than the atmospheric pressure and is open when the pressure of air at the connecting portion 65s is lower than the atmospheric pressure. When the pressure of air at the connecting portion 65s becomes lower than the atmospheric pressure by the operation of the compressor 40, air is sucked from the atmosphere via a filter 43 and the intake valve 44. The air discharge valve 32 is connected to a connecting portion 66s of the fourth passage 66. The air-discharge valve 32 is a normally closed electromagnetic valve. When being in an open state, the air-discharge valve 32 allows discharge of air from the fourth passage 66 to the atmosphere. When being in a closed state, the air-discharge valve 32 prevents discharge of air from the fourth passage 66 to the atmosphere. The air-discharge valve 32 however allows supply of air from the atmosphere to the fourth passage 66 when a pressure of air in the fourth passage 66 becomes lower than the atmospheric pressure by a set pressure in the closed state. A dryer 70 and a flow restricting mechanism 72 are provided in series on the fourth passage 66 at positions located on a side of the connecting portion 66s which is located nearer to the second passage 52. The flow restricting mechanism 72 includes a pressure differential valve 72v and a restrictor 72s provided in parallel. The pressure differential valve 72v prevents flow of air from a second-passage side to a compressor side. When a pressure on the compressor side becomes higher than that on the second-passage side by a set pressure, the pressure differential valve 72v allows flow of air from the compressor 40 to the second passage 52.

Figure 2:
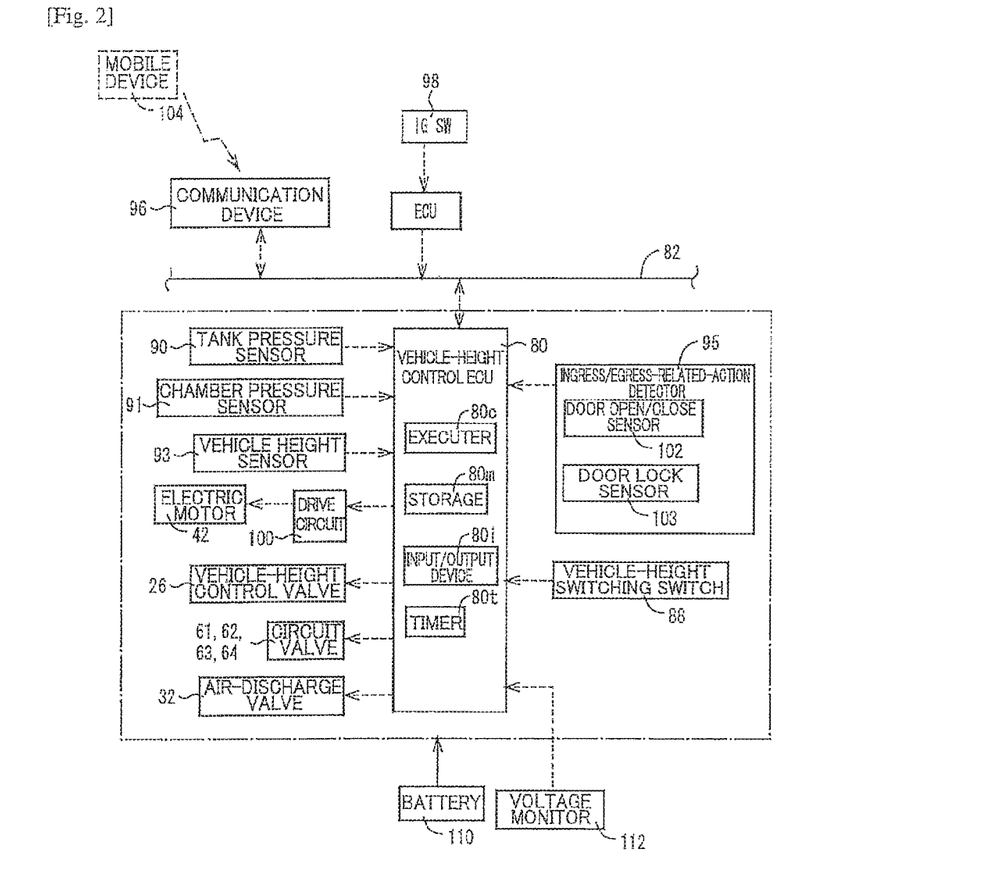
FIG. 2 is a conceptual view illustrating a vehicle-height control ECU and devices connected thereto in the vehicle-height control system.

In the present embodiment, the vehicle-height control system is controlled by a vehicle-height control electronic control unit (ECU) 80 mainly constituted by a computer. The vehicle-height control ECU 80 is communicable with devices, such as ECUs, via a controller area network (CAN) 82. As illustrated in FIG. 2, the vehicle-height control ECU 80 includes an executer 80c, a storage 80m, an input/output device 80i, and a timer 80t. Devices connected to the input/output device 80i include a vehicle-height switching switch 88, a tank pressure sensor 90, a chamber pressure sensor 91, vehicle height sensors 93, and ingress/egress-related-action detectors 95. Also, devices including a communication device 96 and an ignition switch 98 are connected to the input/output device 801 via the CAN 82. The electric motor 42 is connected to the input/output device 80i via a drive circuit 100. The air-discharge valve 32, the vehicle-height control valves 26, and the circuit valves 61-64 are connected to the input/output device 80i.

A driver operates the vehicle-height switching switch 88 to instruct a change of the vehicle height to one of "L" (Low), "N" (Normal), and "H" (High). The tank pressure sensor 90 detects the tank pressure. The chamber pressure sensor 91 is provided on the common passage 22 and measures the chamber pressure that is a pressure of air contained in the air chamber 19 of the air cylinder 2 corresponding to at least one of the vehicle-height control valves 26 (the wheels) which is in its open state. The vehicle height sensors 93 are provided for the respective wheels 2FL, 2FR, 2RL, 2RR. Each of the vehicle height sensors 93 detects a deviation from a standard distance between the wheel-side member and the vehicle-body-side member for the corresponding wheel (noted that the standard distance corresponds to a standard vehicle height) to detect a vehicle height which is a distance between the vehicle-body-side member and the wheel-side member, i.e., a height of the vehicle-body-side member from the wheel-side member for the corresponding wheel. The ingress/egress-related-action detectors 95 detect the presence or absence of operation relating to getting on and off of the vehicle. The ingress/egress-related-action detectors 95 are provided respectively for a plurality of doors provided on the vehicle. Each of the ingress/egress-related-action detectors 95 includes: a door open/close sensor (a courtesy lamp sensor) 102 that detects opening and closing of a corresponding one of the doors; and a door lock sensor 103 that detects a locking operation and an unlocking operation for the corresponding door. Getting on and off and intention of start of driving are estimated based on opening and closing of the door and the locking and unlocking operations for the door, for example. The communication device 96 communicates with a mobile device 104 owned by, e.g., the driver in a predetermined communicable area. The locking and unlocking operations for the door may be performed based on the communication of the communication device 96.

The vehicle-height control system includes a battery 110 as a power source and is operable by electric power supplied from the battery 110. Power voltage as voltage of the battery 110 is detected by a voltage monitor 112 that is connected to the input/output device 80i of the vehicle-height control ECU 80.

In the present vehicle-height control system, vehicle height control is executed in the case where a predetermined condition is satisfied. Examples of this case include: a case where the vehicle-height switching switch 88 is operated; a case where it is estimated that a person is to get on or off the vehicle, and a case where an after-egress set time is elapsed. For example, a deviation is obtained which is a difference between an actual vehicle height H* as a measured value of the vehicle height sensor 93 and a target vehicle height. Href determined based on, e.g., a state of the vehicle-height switching switch 88 and an ingress/egress state. In the case where an absolute value of this deviation is greater than or equal to a set value, it is determined that a vehicle-height control request is issued, that is, it is determined that an initiating condition is satisfied, and a start instruction is output. In the case where the actual vehicle height H* (or an actual vehicle-height change amount which is an actual amount of change of the vehicle height) has been brought close to the target vehicle height Href (or a target amount of change of the vehicle height), for example, in the case where the actual vehicle height H* (or the actual vehicle-height change amount) falls within a set range determined by the target vehicle height Href (or the target amount of change of the vehicle height) and the width of dead band, it is determined that a terminating condition is satisfied, and a termination instruction is output.

Figure 3A:
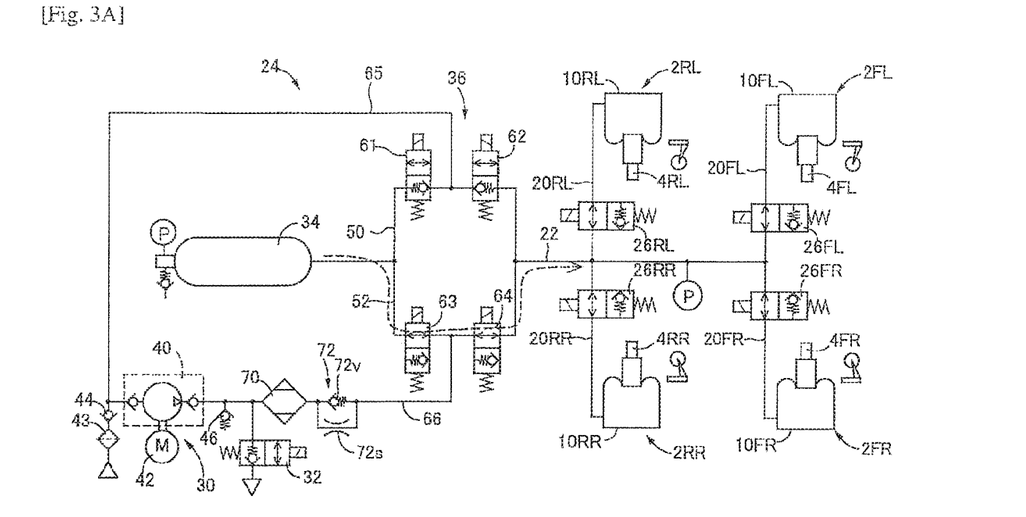
FIG. 3A is a view illustrating a tank-pressure supply state in the vehicle-height control system.
Figure 3B:
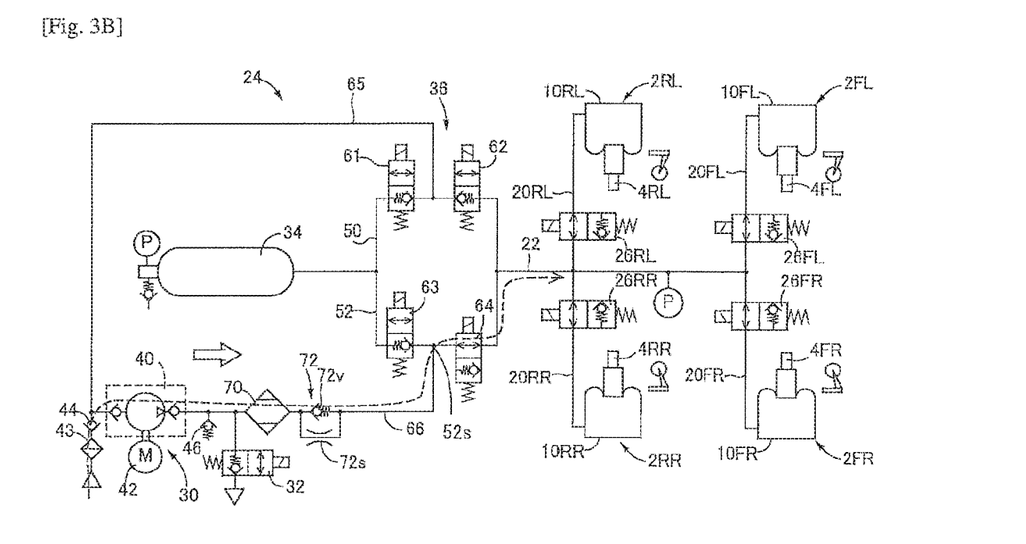
FIG. 3B is a view illustrating a compressor-pressure supply state.

In the present embodiment, for example, the state illustrated in FIG. 3A is established in the case where vehicle height control for increasing the vehicle height (hereinafter may be referred to as "up control") is executed. The circuit valves 61, 62 are closed, the circuit valves 63, 64 are opened, and the vehicle-height control valves 26 corresponding to the respective control target wheels are opened. It is noted that FIG. 3 illustrates a state in which all the four wheels are the control target wheels. Moreover, communication of the tank 34 is established via the common passage 22 with the air chambers 19 defined in the air cylinders 2 provided for the respective control target wheels, so that air is supplied from the tank 34 to the air chambers 19. This state will be referred to as "tank-pressure supply state". In this tank-pressure supply state, the supply of the air from the tank 34 to the air chambers 19 lowers the tank pressure and raises the chamber pressure.

When a switching condition is satisfied in the tank-pressure supply state, as illustrated in FIG. 3B, the circuit valves 61, 62, 63 are closed, the circuit valve 64 is opened, and the compressor device 30 is driven. That is, the common passage 22 is isolated from the tank 34 and communicates with the compressor device 30, so that air is sucked from the atmosphere by the compressor device 30 and supplied to the air chambers 19 via the common passage 22. This state will be referred to as "compressor-pressure supply state". In the compressor-pressure supply state, the chamber pressure, i.e., the discharge pressure of the compressor 40 is raised in a state in which the tank pressure is kept constant, specifically, the chamber pressure becomes higher than the tank pressure.

It is noted that, though not illustrated, in the case where vehicle height control for lowering the vehicle height is executed, the circuit valves 61, 64 are closed, the circuit valves 62, 63 are opened, the compressor device 30 is driven, and the vehicle-height control valves 26 corresponding to the respective control target wheels are opened. Air having flowed out of the air chambers 19 is pressurized by the compressor 40 and transferred back to the tank 34.

Figure 8:
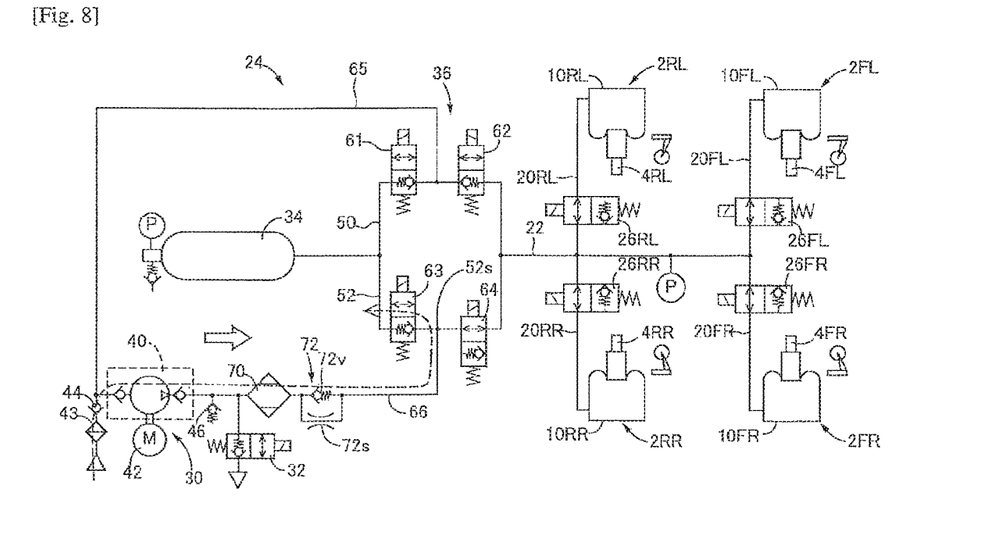
FIG. 8 is a view for explaining a state in which leakage occurs from a cut-off valve in the compressor-pressure supply state.
Figure 9:
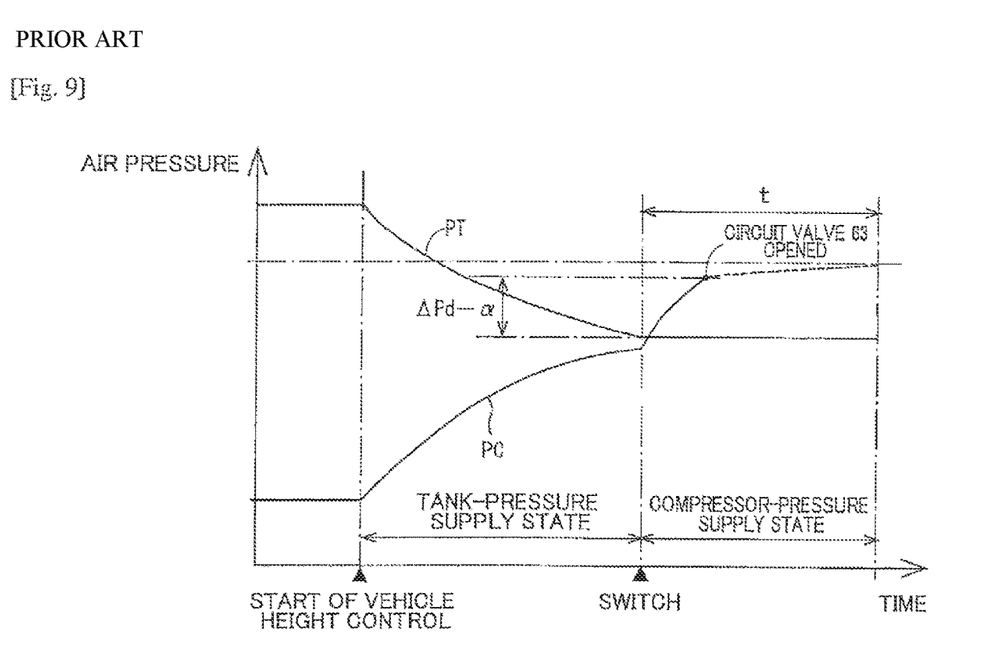
FIG. 9 is a view illustrating changes of the tank pressure and the chamber pressure in the event of the leakage from the cut-off valve.

FIG. 9 illustrates changes of the tank pressure and the chamber pressure in the case where control disclosed in Patent Document 2 is executed in the circuit in FIG. 1. In this case, when a set length of time determined based on a pressure differential between a tank pressure PT and a chamber pressure PC at a time just before the up control is elapsed, that is, when a length of time required for the pressure differential to decrease to such a value that makes it difficult to supply the air from the tank 34 wire air cylinders 2 is elapsed, it is determined that the switching condition is satisfied, and the state of the system is switched from the tank-pressure supply state to the compressor-pressure supply state. For example, in the case where the vehicle height control is not executed for a long time, the vehicle height is low due to leakage of air from the air chambers 19 in some case. In this case, the set length of time may be elapsed without satisfaction of a terminating condition for the up control in the tank-pressure supply state, leading to switch from the tank-pressure supply state to the compressor-pressure supply state. In the case where the pressure in the connecting portion 52s rises, and thereby the pressure differential $\Delta P$ in the circuit valve 63 becomes greater than the valve-opening pressure differential $\Delta Pd$ in the compressor-pressure supply state, the circuit valve 63 is opened, and as illustrated in FIG. 8 air discharged from the compressor 40 and supplied to the connecting portion 52s is principally supplied to the tank 34 via the circuit valve 63. Thus, the tank pressure PT rises by the air discharged and supplied from the compressor 40 in the event of leakage in the circuit valve 63. When the pressure differential $\Delta P$ in the circuit valve 63 becomes less than the valve-opening pressure differential $\Delta Pd$, the circuit valve 63 is closed, so that the air is supplied to the air cylinders 2. Thereafter, the up control is executed while the air discharged from the compressor 40 is being supplied to both of the tank 34 and the air cylinders 2, so that the increase gradient of the chamber pressure PC becomes considerably low as indicated by the broken line in FIG. 9. As a result, a time t of operation of the compressor 40 increases, resulting in increase in power consumption of the battery 110. Also, a time requiring the up control (a time requiring the vehicle height to reach the target vehicle height Href) increases.

Strictly speaking, the pressure differential $\Delta P$ in the circuit valve 63 is a value obtained by subtracting the pressure of air in the portion located on a side of the circuit valve 63 which is located nearer to the tank 34 from the pressure of air in the portion located on a side of the circuit valve 63 which is located nearer to the connecting portion 52s. However, it is possible to estimate that the pressure differential $\Delta P$ in the circuit valve 63 is substantially equal to a value (PS−PT) obtained by subtracting the pressure PT of air in the tank 34 from the pressure PS of air in the connecting portion 52s. The pressure PS of air in the connecting portion 52s is higher than the chamber pressure PC by a pressure loss $\alpha$ (PS≈PC+$\alpha$). Thus, it is possible to consider that the pressure differential $\Delta P$ in the circuit valve 63 is greater than the value obtained by subtracting the tank pressure PT from the chamber pressure PC, by the pressure loss $\alpha$ between the chamber pressure sensor 91 and the connecting portion 52s ($\Delta P$=PC−PT+$\alpha$). Accordingly, as illustrated in FIG. 9, the circuit valve 63 is opened when the value obtained by subtracting the tank pressure PT from the chamber pressure PC (PC−PT) becomes greater than a value obtained by subtracting the pressure loss $\alpha$ from the valve-opening pressure differential $\Delta Pd$ ($\Delta Pd$−$\alpha$).

$$PC-PT>\Delta Pd-\alpha$$

In the compressor-pressure supply state, the chamber pressure PC is the highest when the vehicle height reaches the target vehicle height Href. The target vehicle height Href is in most cases set to High or Normal, and it is possible to preliminarily obtain a target pressure Pref which is the chamber pressure PC at a time when the vehicle height reaches the target vehicle height Href. The tank pressure PT is kept at a value that is a value at a time when the state of the system is switched from the tank-pressure supply state to the compressor-pressure supply state.

In the present embodiment, in contrast, the tank pressure is measured by the tank pressure sensor 90 in the tank-pressure supply state, and when the measured tank pressure PT has lowered and reached a threshold value PTth, the state of the air supply and discharge device 24 is switched to the compressor-pressure supply state, and the threshold value PTth is determined to a value that prevents the maximum value $\Delta Pm$ of the pressure differential $\Delta P$ in the circuit valve 63 in the compressor-pressure supply state from becoming greater than the valve-opening pressure differential $\Delta Pd$.

The maximum value $\Delta Pm$ of the pressure differential $\Delta P$ in the circuit valve 63 in the compressor-pressure supply state is substantially equal to a value obtained by adding the pressure $\alpha$ loss to the value obtained by subtracting the tank pressure PT from the target pressure Pref. This maximum value $\Delta Pm$ is expressed by the following equation:

$$\Delta Pm \approx Pref-PT+\alpha$$

Since the maximum value $\Delta Pm$ is less than or equal to the valve-opening pressure differential $\Delta Pd$, the following equation (1) is established, and the following equation (2) is established by rearranging equation (1):

$$(Pref-PT)+\alpha \leq \Delta Pd \tag{1}$$

$$PT \geq Pref-\Delta Pd+\alpha \tag{2}$$

In the present embodiment, for example, the threshold value PTth is determined by adding a margin $\beta$ to the right side of equation (2) as expressed by the following equation:

$$PTth=(Pref-\Delta Pd+\alpha)+\beta$$

Figure 4:
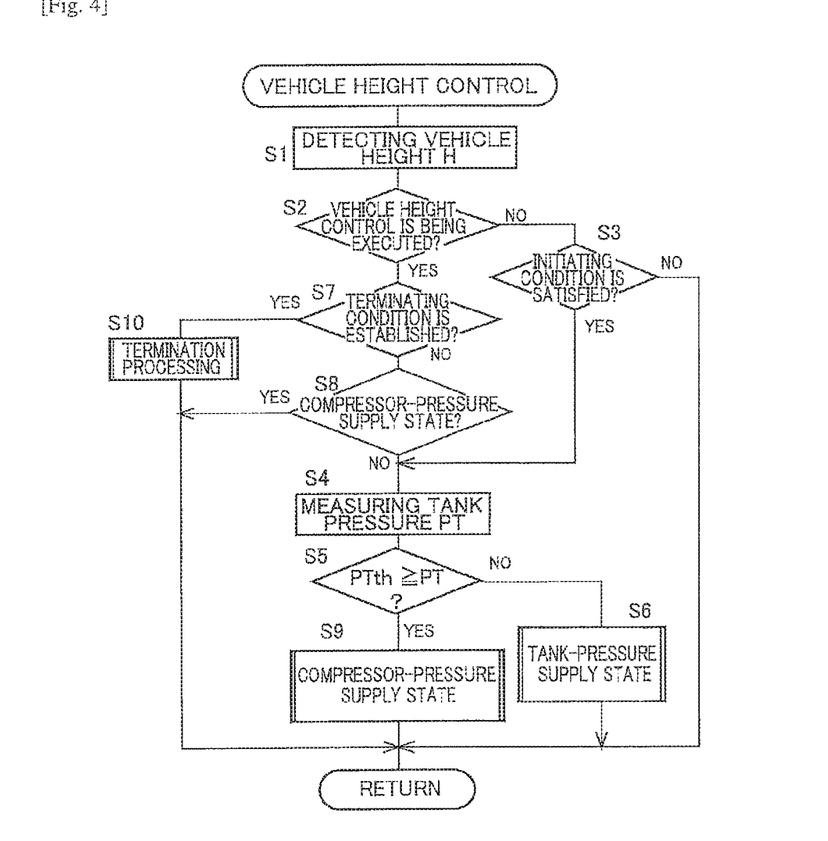
FIG. 4 is a flow chart illustrating a vehicle-height control program stored in a storage of the vehicle-height control ECU.

A vehicle-height control program represented by the flow chart in FIG. 4 is executed each time when a set length of time is elapsed.

At S1, the vehicle height is detected. At S2, it is determined whether the vehicle height control is being executed. When the vehicle height control is not being executed, it is determined at S3 whether an initiating condition is satisfied. When the initiating condition is not satisfied, the processings at S1-S3 are repeated. When the initiating condition is satisfied, the tank pressure sensor 90 at S4 measures the tank pressure. At S5, it is determined whether the measured tank pressure PT is less than or equal to the threshold value PTth. The measured tank pressure PT is in most cases higher than the threshold value PTth at the time when the initiating condition is satisfied. Thus, a negative decision (NO) is made at S5, and this flow goes to S6 at which the circuit valves 61, 62 are closed, and a current is supplied to the solenoids of the respective circuit valves 63, 64 to turn the solenoids to ON to open the circuit valves 63, 64, so that the tank-pressure supply state is established. Also, the vehicle-height control valves 26 corresponding to the respective control target wheels are opened.

Then, since the vehicle height control is being executed, a positive decision (YES) is made at S2, and this flow goes to S7 at which it is determined that the terminating condition is established. When the terminating condition is not established, it is determined at S8 whether the vehicle-height control system is in the compressor-pressure supply state. In this case, since the vehicle-height control system is not in the compressor-pressure supply state, as described above, the tank pressure is measured at S4, and it is determined at S5 whether the measured tank pressure PT is less than or equal to the threshold value PTth. While the measured tank pressure PT is higher than the threshold value PTth, the processings at S1, S2, S7, S8, and S4-S6 are repeated. When the measured tank pressure PT has reached the threshold value PTth, the supply of the current to the solenoid of the circuit valve 63 is stopped at S9 to turn the solenoid to OFF to close the circuit valve 63. Also, the electric motor 42 is actuated to switch the state of the air supply and discharge device 24 to the compressor-pressure supply state. Then, the processings at S1, S2, S7, and S8 are repeated until the terminating condition is satisfied. When the terminating condition is satisfied, a positive decision (YES) is made at S7, and a termination processing is executed at S10. For example, the circuit valves 61-64 are closed, the vehicle-height control valves 26 are closed, and the compressor device 30 is stopped.

Figure 5:
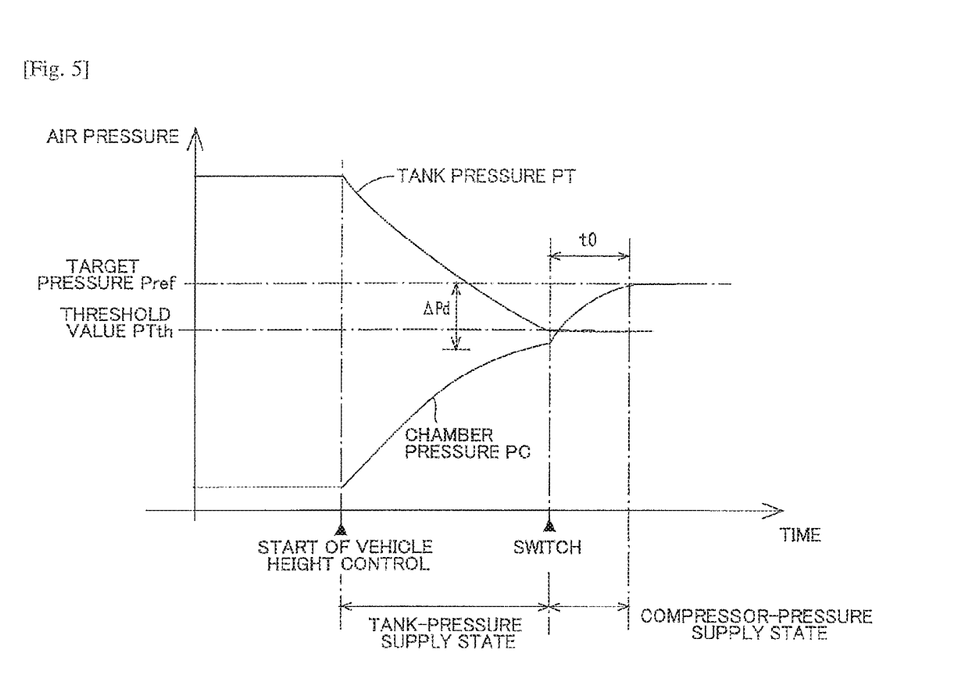
FIG. 5 is a view illustrating changes of a tank pressure and a chamber pressure in the case where vehicle height control is executed in the vehicle-height control system.

FIG. 5 illustrates one example of changes of the tank pressure PT measured by the tank pressure sensor 90 and the chamber pressure PC measured by the chamber pressure sensor 91 during the up control. In the case where the measured tank pressure PT has lowered to the threshold value PTth in the tank-pressure supply state, the state of the air supply and discharge device 24 is switched to the compressor-pressure supply state. The tank pressure PT is kept at the threshold value PTth, and the measured chamber pressure PC is increased in the compressor-pressure supply state. However, since it is difficult for the pressure differential ΔP in the circuit valve 63 to become greater than the valve-opening pressure differential ΔPd, leakage of air in the circuit valve 63 is avoided. As a result, the air discharged from the compressor 40 is supplied to the air cylinders 2 well, thereby preventing a longer time of operation of the compressor 40, resulting in less power consumption of the battery 110 and a reduced possibility of longer time of the up control. In the present embodiment, a time t0 of operation of the compressor 40 is less than the operating time t indicated in FIG. 9.

In the present embodiment, the threshold value and the measured tank pressure that is actually measured by the tank pressure sensor 90 in the tank-pressure supply state are compared with each other, and the state of the air supply and discharge device 24 is switched to the compressor-pressure supply state. Thus, it is possible to more satisfactorily make it difficult for the pressure differential in the circuit valve 63 to become greater than the valve-opening pressure differential, when compared with the case where it is assumed that a length of time estimated to be required for the tank pressure to lower to the threshold value is a set length of time and where the state of the air supply and discharge device 24 is switched to the compressor-pressure supply state when a time elapsed from the start of the tank-pressure supply state has reached the set length of time.

In the present embodiment as described above, a vehicle height controller is constituted by the tank pressure sensor 90 and portions of the vehicle-height control ECU 80 which store and execute the vehicle-height control program, for example. A state switcher is constituted by portions of the vehicle height controller which store and execute the processings at S5, S6, and S9, for example.

It is not essential that the pressure loss α and the margin β are considered to determine the threshold value. For example, the need to consider the pressure loss α is low in the case where a distance between the chamber pressure sensor 91 and the connecting portion 52s is short. The threshold value may be a variable value determined based on the target vehicle height.

The vehicle-height control system may be configured such that the circuit valves 61, 62 are opened, and the circuit valves 63, 64 are closed in the tank-pressure supply state. In other words, the tank pressure is supplied to the air cylinders 2 via a bypass passage including the tank passage 48, the first passage 50, the common passage 22, and the individual passages 20. In this case, although the circuit valve 63 is in the closed state when the vehicle-height control system is in any of the tank-pressure supply state and the compressor-pressure supply state, the expression "the circuit valve 63 is closed" is used when the vehicle-height control system is switched to the compressor-pressure supply state.

All the circuit valves 61-64 may be opened in the tank-pressure supply state. Working liquid as fluid may be used as a pressure medium.

Second Embodiment

In the present embodiment, the threshold value PTth is not a fixed value but a variable value. For example, the vehicle-height control system may be configured to estimate a load applied to the wheel based on, e.g., the chamber pressure and the vehicle height at a time just before the up control and to determine the threshold value PTth to a larger value when the estimated load is large than when the estimated load is small. This is because the target pressure Pref as the chamber pressure in the case where the vehicle height has reached the target vehicle height Href is higher when the estimated load is large than when the estimated load is small. For example, as illustrated in FIG. 6B, a table representing a relationship between the chamber pressure and the vehicle height in the case where the load is a standard load is stored in advance, and it is estimated that the load is higher than the standard load in the case where the chamber pressure is higher with respect to the relationship. The threshold value may be determined to a larger value in the case where the load is higher than the standard load then in the case where the load is less than or equal to the standard load.

Figure 6A:
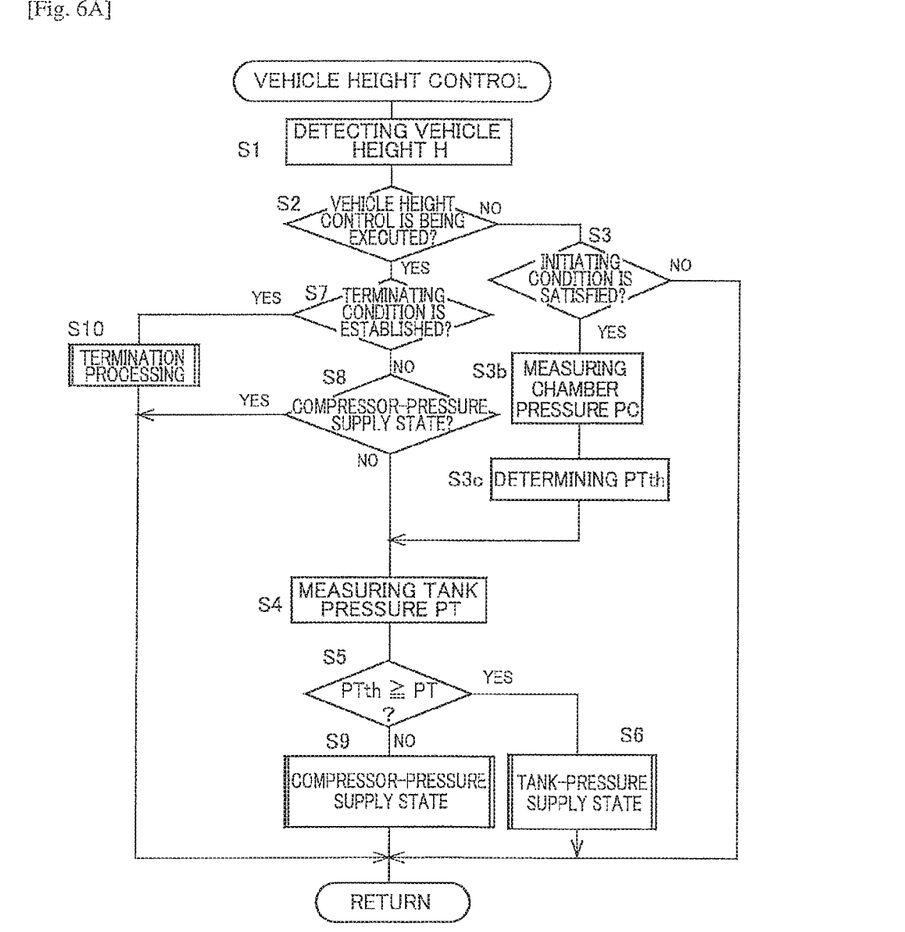
FIG. 6A is a flow chart illustrating a vehicle-height control program stored in a storage of a vehicle-height control ECU of a vehicle-height control system according to a second embodiment.
Figure 6B:
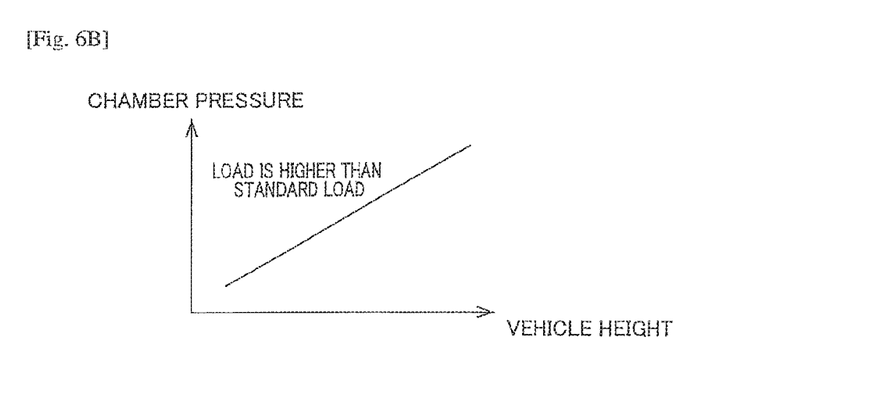
FIG. 6B is a map representing a load estimation table stored in the storage.

FIG. 6A is a flow chart illustrating one example of a vehicle-height control program in this case. It is noted that the same step numbers as used in the vehicle-height control program in the first embodiment are used to designate the corresponding processings in the flow chart in FIG. 6A, and an explanation of which is dispensed with. In the present embodiment, when the initiating condition is satisfied, a positive decision (YES) is made at S3, and this flow goes to S3b at which the chamber pressure sensor 91 measures the chamber pressure. At S3c, a load is estimated based on, e.g., the measured chamber pressure PC and the vehicle height detected at S1, and the threshold value PTth is determined. At S4 and subsequent steps, as in the case in the first embodiment, the tank pressure PT is measured by the tank pressure sensor 90, the measured tank pressure and the threshold value are compared with each other, and the state of the air supply and discharge device 24 is switched from the tank-pressure supply state to the compressor-pressure supply state. The up control may be executed for the four wheels in common or individually. In the case where the up control is executed for the four wheels in common, the vehicle-height control system may calculate the threshold value PTth by calculating an average value of loads based on an average value of the vehicle heights for the four wheels and an average value of the chamber pressures PC for the four wheels.

In this embodiment, even in the case where a load applied to the wheel is large, and the chamber pressure PC in the case where the vehicle height has reached the target vehicle height is high, it is possible to prevent or reduce leakage in the circuit valve 63 well in the compressor-pressure supply state and avoid a longer time of operation of the compressor 40 well.

Third Embodiment

A construction of the air supply and discharge device is not limited. For example, in an air supply and discharge device 24\* illustrated in FIG. 7, the compressor device 30 is connected to a connecting portion 130 via a fourth passage 66\*, and the tank 34 is connected to a connecting portion 131 of the second passage 52 via a tank passage 48\*. The connecting portion 130 connects the first passage 50 and the second passage 52 to each other. The connecting portion 131 is located between a circuit valve 63\* and the circuit valve 64. In the present embodiment, a passage 132 is constituted by the fourth passage 66\*, the first passage 50, the common passage 22, and the individual passages 20, for example. The tank 34 is connected to the connecting portion 130 of the passage 132 by the tank passage 48\* and a portion of the second passage 52 which is located between the connecting portion 130 and the connecting portion 131. The circuit valve 63\* is provided on the second passage 52 at a position located between the connecting portion 131 and the connecting portion 130.

Figure 7:
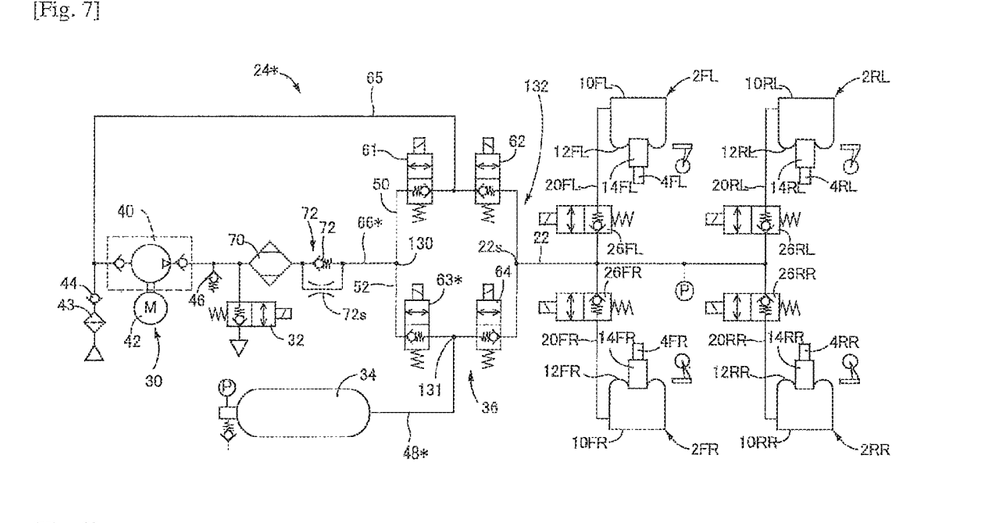
FIG. 7 is a circuit diagram of a vehicle-height control system according to a third embodiment.

In the present embodiment, the circuit valves 61, 62, 63\* are closed, and the circuit valve 64 is opened in the tank-pressure supply state. The circuit valves 61, 62 are opened, and the circuit valve **63\*, 64 are closed in the compressor-pressure supply state. The circuit valve 63\* is another example of the cut-off valve and is installed in a state in which a force related to a pressure differential $\Delta P$ acts on the circuit valve 63\* in a direction in which a valve member of the circuit valve 63\* is moved off a valve seat of the circuit valve 63\* against a resilient force of a spring of the circuit valve 63\*. The pressure differential $\Delta P$ is obtained by subtracting a pressure of air in a portion located on a side of the circuit valve 63\* which is located nearer to the tank 34 from a pressure of air in a portion located on a side of the circuit valve 63\* which is located nearer to the connecting portion 130. With this construction, when the pressure differential $\Delta P$ is greater than the valve-opening pressure differential $\Delta Pd$, leakage occurs in the circuit valve 63\*, allowing air flow from the compressor 40 to the tank 34**.

In the present embodiment, as in the first and second embodiments, it is possible to switch the state of the air supply and discharge device 24 to the compressor-pressure supply state when the measured tank pressure PT has lowered to the threshold value PTth in the tank-pressure supply state. As a result, it is possible to make it difficult for the pressure differential in the circuit valve 63\* in the compressor-pressure supply state to become greater than the valve-opening pressure differential $\Delta Pd$.

It is to be understood that the disclosure may be embodied with various changes and modifications, which may occur to those skilled in the art.

CLAIMABLE INVENTIONS

There will be explained claimable inventions.
(1) A vehicle-height control system, comprising:
a pressure medium supplier comprising (i) a tank configured to store a pressure medium in a state in which the pressure medium is pressurized, and (ii) a compressor device comprising a compressor and an electric motor configured to drive the compressor,
a vehicle-height control actuator connected to the pressure medium supplier and provided so as to correspond to a wheel;
a vehicle height controller configured to raise a vehicle height for the wheel by supplying the pressure medium from the pressure medium supplier to the vehicle-height control actuator by controlling the pressure medium supplier in response to a request for a raise of the vehicle height,
wherein the vehicle height controller comprises:
a tank pressure sensor configured to measure a tank pressure that is a pressure of the pressure medium stored in the tank; and
a state switcher configured to switch a state of the pressure medium supplier from a tank-pressure supply state to a compressor-pressure supply state based on a measured tank pressure that is a value measured by the tank pressure sensor in the tank-pressure supply state, wherein the tank-pressure supply state is a state in which the pressure medium is supplied from the tank to the vehicle-height control actuator, and the compressor-pressure supply state is a state in which the pressure medium is supplied from the compressor device to the vehicle-height control actuator.

(2) The vehicle-height control system according to the above form (1), wherein the state switcher is configured to switch the state of the pressure medium supplier from the tank-pressure supply state to the compressor-pressure supply state when the measured tank pressure has lowered and reached a threshold value.

(3) The vehicle-height control system according to the above form (1) or (2),
wherein the vehicle-height control actuator is connected to the tank and the compressor,
wherein the pressure medium supplier comprises a cut-off valve that is an electromagnetic valve provided between the tank and the compressor,
wherein the cut-off valve is switched from a closed state to an open state by a force related to a pressure differential, when the pressure differential becomes greater than a valve-opening pressure differential for the cut-off valve, wherein the pressure differential is a value obtained by subtracting a pressure of the pressure medium on a side of the cut-off valve which is nearer to the tank than the compressor from a pressure of the pressure medium on a side of the cut-off valve which is nearer to the compressor than the tank, and
wherein the state switcher is configured to switch the state of the pressure medium supplier to the compressor-pressure supply state by closing the cut-off valve and actuating the electric motor.

(4) The vehicle-height control system according to the above form (3),
wherein the tank is connected via the cut-off valve to a connecting portion of a passage connecting a discharge portion of the compressor and the vehicle-height control actuator to each other, and
wherein the cut-off valve is switched from the closed state to the open state by a force related to a pressure differential, when the pressure differential becomes greater than the valve-opening pressure differential for the cut-off valve, wherein the pressure differential is a value obtained by subtracting a pressure of the pressure medium on a side of the cut-off valve which is nearer to the tank than the connecting portion from a pressure of the pressure medium on a side of the cut-off valve which is nearer to the connecting portion than the tank.

(5) The vehicle-height control system according to the above form (4), wherein the pressure medium supplier comprises a bypass passage connecting the tank and the vehicle-height control actuator to each other by bypassing the cut-off valve.

In the case where the bypass passage is provided, it is possible to establish the tank-pressure supply state even when the cut-off valve is closed. Thus, it is possible to switch the state of the pressure medium supplier from the tank-pressure supply state to the compressor-pressure supply state, with the cut-off valve kept closed. Even in this case, in the present specification, the expression "the circuit valve is closed" is used when the state of the pressure medium supplier is switched from the tank-pressure supply state to the compressor-pressure supply state.

(6) The vehicle-height control system according to the above form (3), wherein a discharge portion of the compressor and the vehicle-height control actuator are connected by a sixth passage and a seventh passage in parallel, wherein the tank is connected to the seventh passage, and wherein the cut-off valve is provided on the seventh passage at a position located between a discharge portion of the compressor and a portion of the seventh passage which is connected to the tank.

For example, the cut-off valve may be closed in any of the tank-pressure supply state and the compressor-pressure supply state. In this case, the tank pressure is supplied to the vehicle-height control actuator via the seventh passage in the tank-pressure supply state, and a pressure of the pressure medium discharged from the compressor is supplied to the vehicle-height control actuator via the sixth passage in the compressor-pressure supply state. The sixth passage and the seventh passage may or may not contain a shared portion. That is, the compressor and the vehicle-height control actuator at least need to be connected via different passages.

In the first embodiment, the sixth passage includes the fourth passage 66, a portion of the second passage 52 which is located between the connecting portion 52*s* and the connecting portion 22*s*, the common passage 22, and the individual passages 20. The seventh passage includes the fourth passage 66, the portion of the second passage 52 between the connecting portion 48*s* and the connecting portion 52*s*, the first passage 50, the common passage 22, and the individual passages 20. In the third embodiment, the sixth passage includes the fourth passage the first passage 50, the common passage 22, and the individual passages 20. The seventh passage includes the fourth passage 66*, the second passage 52, the common passage 22, and the individual passages 20.

(7) The vehicle-height control system according to any one of the above forms (2) through (6), wherein the threshold value is a value determined based on a value obtained by subtracting a valve-opening pressure differential for the cut-off valve from a target pressure that is a pressure of the pressure medium in the vehicle-height control actuator in a case where the vehicle height has reached a target vehicle height.

The threshold value may be determined to a such value that makes is difficult for the cut-off valve to be switched from its closed state to its open state in the compressor-pressure supply state.

(8) The vehicle-height control system according to any one of the above forms (2) through (7), wherein the vehicle height controller comprises an actuator pressure sensor configured to measure an actuator pressure that is a pressure of the pressure medium in the vehicle-height control actuator, and wherein the state switcher comprises a threshold value determiner configured to determine the threshold value to a greater value when a measured actuator pressure that is a value measured by the actuator pressure sensor at a start of control for raising the vehicle height is high than when the measured actuator pressure is low.

A load exerted on the wheel is usually received by the pressure medium in the vehicle-height control actuator and components of a suspension such as a bushing and a spring. A load received by the components of the suspension is smaller, and the actuator pressure is higher in the case where the vehicle height is high than in the case where the vehicle height is low. Thus, in the case where the vehicle height is the same, the actuator pressure is higher when the load exerted on the wheel is large than when the load exerted on the wheel is small. Also, the actuator pressure in the case where the vehicle, height has reached the target vehicle height is higher when the load exerted on the wheel is large than when the load exerted on the wheel is small.

In view of the circumstances described above, the vehicle-height control system may be configured such that the load exerted on the wheel is estimated based on the actuator pressure in the case where the vehicle height at the timing just before the start of the vehicle height control is substantially the same, and the threshold value is calculated based on the estimated load. Also, the vehicle-height control system may be configured such that it is estimated based on the vehicle height and the actuator pressure that the load exerted on the wheel is larger when the actuator pressure is high with respect to the vehicle height than when the actuator pressure is low with respect to the vehicle height, and the threshold value is determined to a lamer value when the estimated load is large than when the estimated load is small.

(9) The vehicle-height control system, according to any one of the above forms (1) through (8), wherein the vehicle height controller is configured to establish the tank-pressure supply state when a request for a raise of the vehicle height is issued.

(10) A vehicle-height control system, comprising:

a vehicle-height control actuator provided so as to correspond to a wheel;

a pressure medium supplier comprising (i) a tank connected to the vehicle-height control actuator and configured to store a pressure medium in a state in which the pressure medium is pressurized, (ii) a compressor device comprising a compressor and an electric motor configured to drive the compressor, and (iii) a cut-off valve that is an electromagnetic valve provided between the tank and the compressor and comprising a solenoid;

a tank pressure sensor configured to measure a tank pressure that is a pressure of the pressure medium stored in the tank; and a vehicle height controller configured to raise a vehicle height for the wheel by supplying the pressure medium from the pressure medium supplier to the vehicle-height control actuator by controlling the pressure medium supplier in response to a request for a raise of the vehicle height, wherein the tank is connected via the cut-off valve to a connecting portion of a passage connecting a discharge portion of the compressor and the vehicle-height control actuator to each other, wherein the vehicle height controller comprises a state switcher configured to switch a state of the pressure medium supplier from a tank-pressure supply state to a compressor-pressure supply state by closing the cut-off valve and actuating the electric motor, wherein the tank-pressure supply state is a state in which the pressure medium is supplied from the tank to the vehicle-height control actuator, and the compressor-pressure supply state is a state in which the pressure medium is supplied from the compressor device to the vehicle-height control actuator, wherein the state switcher is configured to switch the state of the pressure medium supplier from the tank-pressure supply state to the compressor-pressure supply state based on a measured tank pressure that is a value measured by the tank pressure sensor in the tank-pressure supply state.

(11) The vehicle-height control system according to any one of the above forms (3) through (10), wherein the cut-off valve is switched from a closed state to an open state by a force related to a pressure differential, when the pressure differential becomes greater than a valve-opening pressure differential for the cut-off valve, wherein the pressure differential is a value obtained by subtracting a pressure of the pressure medium on a side of the cut-off valve which is nearer to the tank than the compressor from a pressure of the pressure medium on a side of the cut-off valve which is nearer to the compressor than the tank.

(12) The vehicle-height control system according to any one of the above forms (3) through (11), wherein the vehicle height controller is configured to turn the solenoid of the cut-off valve to its ON state in the tank-pressure supply state to open the cut-off valve, and wherein the state switcher is configured to switch the cut-off valve from an open state to a closed state by turning the solenoid of the cut-off valve to its OFF state when switching the state of the pressure medium supplier from the tank-pressure supply state to the compressor-pressure supply state.

For example, in the case where the cut-off valve is a normally closed valve, the cut-off valve is opened by supply of a current to the solenoid (the solenoid: ON) and closed by supply of no current to the solenoid (the solenoid: OFF). In the compressor-pressure supply state, the solenoid of the cut-off valve is kept off.

(13) The vehicle-height control system according to any one of the above forms (3) through (11), wherein the tank and the vehicle-height control actuator are connected to each other by a bypass passage that bypasses the cut-off valve and the compressor, and wherein the vehicle height controller is configured to establish an OFF state of the solenoid of the cut-off valve and a closed state of the cut-off valve in any of the tank-pressure supply state and the compressor-pressure supply state.

The invention claimed is:

1. A vehicle-height control system, comprising:
   a vehicle-height control actuator provided so as to correspond to a wheel;
   a pressure medium supplier comprising (i) a tank connected to the vehicle-height control actuator and configured to store a pressure medium in a state in which the pressure medium is pressurized, (ii) a compressor device comprising a compressor and an electric motor configured to drive the compressor, and (iii) a cut-off valve that is an electromagnetic valve provided between the tank and the compressor and comprising a solenoid;
   a tank pressure sensor configured to measure a tank pressure that is a pressure of the pressure medium stored in the tank; and
   a vehicle height controller configured to raise a vehicle height for the wheel by supplying the pressure medium from the pressure medium supplier to the vehicle-height control actuator by controlling the pressure medium supplier in response to a request for a raise of the vehicle height,
   wherein the tank is connected via the cut-off valve to a connecting portion of a passage connecting a discharge portion of the compressor and the vehicle-height control actuator to each other,
   wherein the vehicle height controller comprises a state switcher configured to switch a state of the pressure medium supplier from a tank-pressure supply state to a compressor-pressure supply state by closing the cut-off valve and actuating the electric motor, wherein the tank-pressure supply state is a state in which the pressure medium is supplied from the tank to the vehicle-height control actuator, and the compressor-pressure supply state is a state in which the pressure medium is supplied from the compressor device to the vehicle-height control actuator,
   wherein the state switcher is configured to switch the state of the pressure medium supplier from the tank-pressure supply state to the compressor-pressure supply state based on a measured tank pressure that is a value measured by the tank pressure sensor in the tank-pressure supply state, and
   wherein, the cut-off valve is configured to, while the pressure medium supplier is in the compressor-pressure supply state, be switched from a closed state to an open state by a force caused by a pressure differential when the pressure differential becomes greater than a valve-opening pressure differential for the cut-off valve, wherein the pressure differential is a value obtained by subtracting a pressure of the pressure medium on a side of the cut-off valve which is nearer to the tank than the compressor from a pressure of the pressure medium on a side of the cut-off valve which is nearer to the compressor than the tank.

2. The vehicle-height control system according to claim 1, wherein the state switcher is configured to switch the state of the pressure medium supplier from the tank-pressure supply state to the compressor-pressure supply state when the measured tank pressure has lowered and reached a threshold value.

3. The vehicle-height control system according to claim 2, wherein the vehicle height controller comprises an actuator pressure sensor configured to measure an actuator pressure that is a pressure of the pressure medium in the vehicle-height control actuator, and
   wherein the state switcher comprises a threshold value determiner configured to determine the threshold value to a greater value when a measured actuator pressure that is a value measured by the actuator pressure sensor at a start of control for raising the vehicle height is high than when the measured actuator pressure is low.

4. The vehicle-height control system according to claim 2, wherein the threshold value is determined based on the valve-opening pressure differential for the cut-off valve.

5. The vehicle-height control system according to claim 1, wherein the vehicle height controller is configured to establish the tank-pressure supply state of the pressure medium supplier when a request for a raise of the vehicle height is issued.

6. The vehicle-height control system according to claim 1, wherein the vehicle height controller is configured to turn the solenoid of the cut-off valve on in the tank-pressure supply state to open the cut-off valve, and
   wherein the state switcher is configured to switch the cut-off valve from an open state to a closed state by turning the solenoid of the cut-off valve off when switching the state of the pressure medium supplier from the tank-pressure supply state to the compressor-pressure supply state.

7. The vehicle-height control system according to claim 1, wherein the tank and the vehicle-height control actuator are connected to each other by a bypass passage that bypasses the cut-off valve and the compressor, and
wherein the vehicle height controller is configured to establish an OFF state of the solenoid of the cut-off valve and a closed state of the cut-off valve in any of the tank-pressure supply state and the compressor-pressure supply state.

8. A vehicle-height control system, comprising:
a vehicle-height control actuator provided so as to correspond to a wheel;
a pressure medium supplier comprising (i) a tank connected to the vehicle-height control actuator and configured to store a pressure medium in a state in which the pressure medium is pressurized, (ii) a compressor device comprising a compressor and an electric motor configured to drive the compressor, and (iii) a cut-off valve that is an electromagnetic valve provided between the tank and the compressor and comprising a solenoid;
a tank pressure sensor configured to measure a tank pressure that is a pressure of the pressure medium stored in the tank; and
a vehicle height controller configured to raise a vehicle height for the wheel by supplying the pressure medium from the pressure medium supplier to the vehicle-height control actuator by controlling the pressure medium supplier in response to a request for a raise of the vehicle height,
wherein the tank is connected via the cut-off valve to a connecting portion of a passage connecting a discharge portion of the compressor and the vehicle-height control actuator to each other,
wherein the vehicle height controller comprises a state switcher configured to switch a state of the pressure medium supplier from a tank-pressure supply state to a compressor-pressure supply state by closing the cut-off valve and actuating the electric motor, wherein the tank-pressure supply state is a state in which the pressure medium is supplied from the tank to the vehicle-height control actuator, and the compressor-pressure supply state is a state in which the pressure medium is supplied from the compressor device to the vehicle-height control actuator,
wherein the state switcher is configured to switch the state of the pressure medium supplier from the tank-pressure supply state to the compressor-pressure supply state based on a measured tank pressure that is a value measured by the tank pressure sensor in the tank-pressure supply state,
wherein the state switcher is configured to switch the state of the pressure medium supplier from the tank-pressure supply state to the compressor-pressure supply state when the measured tank pressure has lowered and reached a threshold value, and
wherein the threshold value is determined by subtracting a valve-opening pressure differential for the cut-off valve from a target pressure that is a pressure of the pressure medium in the vehicle-height control actuator in a case where the vehicle height has reached a target vehicle height.

* * * * *